(12) United States Patent
Akerib

(10) Patent No.: US 6,195,738 B1
(45) Date of Patent: Feb. 27, 2001

(54) COMBINED ASSOCIATIVE PROCESSOR AND RANDOM ACCESS MEMORY ARCHITECTURE

(75) Inventor: Avidan Akerib, Holon (IL)

(73) Assignee: Associative Computing Ltd., Raanana (IL)

( * ) Notice: Subject to any disclaimer, the term of this patent is extended or adjusted under 35 U.S.C. 154(b) by 0 days.

(21) Appl. No.: 09/140,411

(22) Filed: Aug. 26, 1998

Related U.S. Application Data

(60) Continuation-in-part of application No. 09/052,164, filed on Mar. 31, 1998, now Pat. No. 5,974,521, which is a division of application No. 08/353,612, filed on Dec. 9, 1994, now Pat. No. 5,809,322.

(30) Foreign Application Priority Data

Dec. 12, 1993 (IL) ........................................................ 107996
May 26, 1994 (IL) ........................................................ 109801

(51) Int. Cl.$^7$ ............................. G06F 12/06; G11C 15/04
(52) U.S. Cl. ................................. 712/12; 712/13; 712/14; 712/18; 712/15; 711/128; 711/168
(58) Field of Search ..................................... 711/100, 202, 711/101, 128, 129, 145, 149, 163, 168, 173, 118; 712/12, 19, 13, 23, 14, 18, 15

(56) References Cited

U.S. PATENT DOCUMENTS 4,376,974 * 3/1983 Stewart et al. ...................... 711/100
5,343,559 * 8/1994 Lee ...................................... 711/202

* cited by examiner

*Primary Examiner*—Daniel H. Pan
(74) *Attorney, Agent, or Firm*—Mark M. Friedman

(57) ABSTRACT

An architecture combining an associative processor memory array and a random access memory is provided. This combination architecture enables utilizing the parallel processing abilities of the associative processor memory array while storing temporary results and parameters in the random access memory for a fully programmable, low-cost die suitable for consumer electronics applications. Parallel communication between thousands of memory words in the associative memory array and the random access memory is provided via logic hardware operative as source and destination for associative search and modify (compare and write) processing operations and also operative to read and write thousands of data elements from and to the random access memory. The tags register also serves as a communication bus for parallel communication between associative memory words.

5 Claims, 1 Drawing Sheet

COMBINED ASSOCIATIVE PROCESSOR AND RANDOM ACCESS MEMORY ARCHITECTURE

This is a continuation-in-part of U.S. patent application Ser. No. 09/052,164, filed Mar. 31, 1998, now U.S. Pat. No. 5,974,521, issued Oct. 26, 1999, which is a divisional application of U.S. patent application Ser. No. 08/353,612, filed Dec. 9, 1994, now U.S. Pat. No. 5,809,322, issued Sep. 15, 1998.

FIELD AND BACKGROUND OF THE INVENTION

The present invention relates to associative processors, and, more particularly, to a combined architecture featuring an associative processor and a random access memory. By combining these two elements the performance of the associative processor associative processor is greatly enhanced and the cost is reduced making the product cost effective for consumer applications, such as digital still cameras, digital camcorders, multi-function peripherals, 2-D and 3-D graphics accelerators, video effects.

In associative processors, each associative word typically contains a data element and all elements are processed in parallel. In applications that require a large number of parameters, such as geometric transformations, the large number of parameters for calculating the transform for each pixel has required very large associative memory words (or several memory words) to process each element. For example, polygon transformation and rendering in 3-D graphics dealing with polygons having three vertices, requires ten parameters per vertex (x,y,z vertex coordinates (30 bits); Nx,Ny,Nz coordinates of the vertex's normal vector (30 bits); R,G,B 24-bit vertex color (24 bits); and an object ID(20 bits)) and three vertices are required for each polygon. This requires a total of 300 bits to store the initial parameters alone. When calculating the transformation, additional temporary storage are required as well for a total of over 1000 bits per polygon. The relatively large die size of associative memory cells makes this solution expensive.

Alternatively, the parameters and temporary results can be stored outside the associative array. This solution too, is less than satisfactory because input and output are done serially for each word and thus consume a large amount of time. It would be highly advantageous to have an architecture capable of storing large amounts of data required for processing in standard, non-associative memory cells while providing parallel access and communication between these cells and the associative array.

By contrast, if the polygon transformation is executed on an architecture in which temporary results and parameters are stored in standard memory cells in parallel communication with the associative memory cells, high performance is maintained using only few associative memory cells to perform the actual calculations.

Furthermore, an entire image can be stored in a very small random access memory (such as DRAM) die size. By providing massively parallel communication between the associative processor array and the random access memory, via the tags unit, a super-high bandwidth is achieved between the associative processor array and the image memory that eliminates the I/O bottleneck that restricts the performance of other processors. For example, an associative array of 8,192 associative memory words using a tags unit which is in parallel communication with all associative words (the tags unit will therefore typically store 8,192 bits) would provide a communication bus of 8,192 bits. At a clock rate of 100 MHz, this provides bandwidth of 100 giga-byte per second. There is thus a widely recognized need for, and it would be highly advantageous to have, an associative memory processor architecture that is in parallel communication with standard random access memory.

SUMMARY OF THE INVENTION

According to the present invention there is provided an associative processor array, that includes a plurality of associative memory words, in parallel communication with a standard memory, such as but not limited to, random access memory.

The present invention teaches a signal processing apparatus featuring: an associative memory array that includes a plurality of associative memory words operative to perform parallel associative compare and parallel associative write operations;

a random access memory; and, a tags unit in communication with a plurality of the associative memory words and in communication with the random access memory.

The tags unit can be realized in many forms, such as, but not limited to, a simple register, an array of registers, a logic cell array, shift registers, full adders, half-adders. The tags unit is operative as a source for parallel write operations and as a destination for parallel compare operations. A parallel write operation is an associative write operation whereby at least one bit position is selected by a bit-selector unit (typically featuring a mask register, see FIG. 1) and a plurality of associative memory words are selected by the tags unit and all bits thus selected are written to in parallel. In this capacity, the tags unit serves as a source as it selects words that will be written to. The data that is written in parallel is typically contained in a pattern register (see FIG. 1), but could also be part of the write instruction or defined as a value of '1.'

A parallel compare operation selects at least one bit position using a mask register and selects words in which the selected bit position will be compared. This instruction can also select all words and thereby compare the selected bit position in all words. The pattern searched for can be stored in the pattern register, be part of the instruction or be a set value of '1.' All successful matches issue a responder to the tags unit. Thus, in this compare operation, the tags unit serves as a destination for the results of the compare operation.

The tags unit is further operative to read and write thousands of data elements to and from the random access memory. The tags unit can write its entire contents to the random access memory in a single cycle. The tags unit can also read data from the random access memory in a single machine cycle. In this way, the tags unit serves as a conduit for information flowing between the associative memory array and the random access memory.

According to further features in preferred embodiments of the invention described below, the signal processing apparatus includes a plurality of tags units. These units are operative to enable performing an associative compare or write operation using at least one of the tags units while another of the tags units is used to perform a read or write operation with the random access memory.

According to still further features in preferred embodiments of the invention described below, the random access memory is an embedded DRAM.

According to further features in preferred embodiments of the invention described below, the tags units are also operative to perform parallel communication between non-adjacent associative memory words in a single machine cycle.

According to further features in preferred embodiments of the invention described below, the non-adjacent associative memory words are processing non-adjacent samples in an image.

According to further features in preferred embodiments of the invention described below, the signal processing apparatus is contained on a single silicon die.

The present invention successfully addresses the shortcomings of the presently known configurations by providing a low-cost associative parallel architecture capable of executing highly complex functions requiring a large number of parameters and temporary storage space using associative processing methods without the requisite cost of large associative memories for storing these parameters and results, and providing fast parallel communication between thousands of associative memory words and random access memory.

BRIEF DESCRIPTION OF THE DRAWINGS

The invention is herein described, by way of example only, with reference to the accompanying drawings, wherein.

Figure 1:
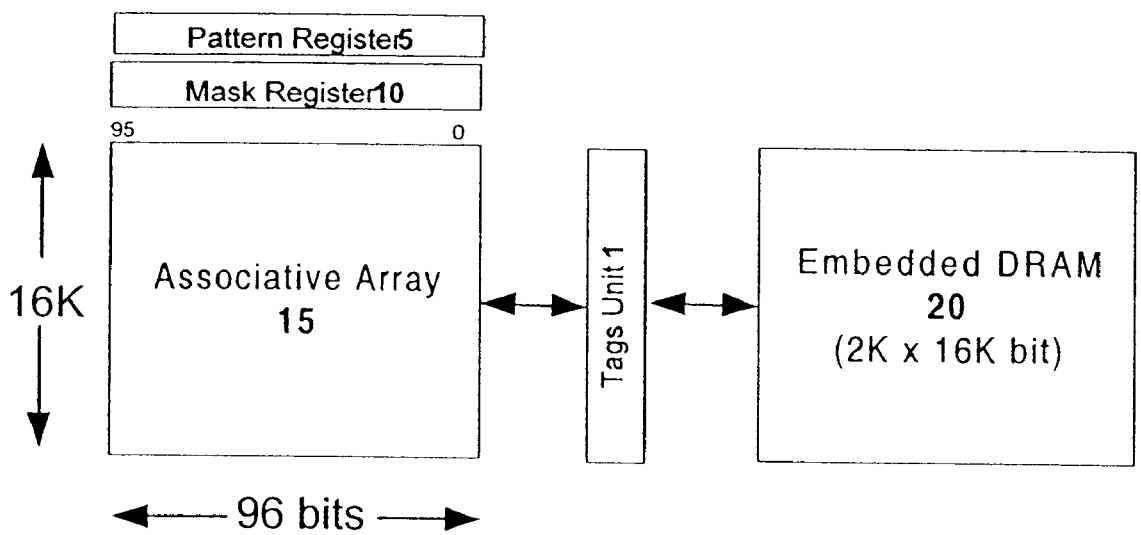
FIG. 1 is a block diagram of the associative processing array and random access memory and illustrates the function of the tags unit as a communication channel between these two sections.

Associative array 15 is shown including 16K associative memory words of 96 bits each. The associative processor also features mask register 10 and pattern register 5 for column control and tags unit 1 for row control. Embedded DRAM 20 of 4 MB is shown as w. Tags unit 1 is in communication with DRAM 20 and with associative memory array 15.

DESCRIPTION OF THE PREFERRED EMBODIMENTS

The present invention is for an associative processor architecture combining an associative memory array and a random access memory. The architecture provides parallel communication between the random access memory and the associative memory array.

Specifically, the present invention can be used to produce a low-cost, massively parallel associative processor capable of executing very complex algorithms on very large blocks of data in parallel.

Referring now to the drawings, FIG. 1 illustrates the connection between associative memory array 15 and random access memory 20. Tags unit 1 is the conduit for communication between these two sections of the architecture. Tags unit 1 serves as source and destination for the basic associative processing operations: compare (search) and write (modify).

The basic associative command architecture comprises three units: a bit-slice selector; a word-slice selector; and a two-dimensional associative memory array (Associative Computing Ltd., the assignee of the present invention, currently manufactures a processor featuring 2,048 associative memory words of 128 bits each logically arranged as a two-dimensional memory array). The bit-slice selector features two registers: mask register 10 and pattern register 5. Mask register 10 selects a bit slice in all words in associative memory array 15 that will participate in the associative operation. Pattern register 5 stores a pattern ('0' or '1') that will be broadcast to the selected bit slice.

The word-slice selector selects associative memory words that will participate in the associative operation. Thus, for a bit to participate in an associative operation it must belong to a word selected by the word-slice selector and its position in that word must be selected mask register 10.

A compare operation compares the selected bit or bits in each selected word to the pattern register contents. Positive matches issue a responder that is stored in a register that is part of the word-slice selector unit. This register is tags unit 1. The word-selector unit can contain a plurality of tags units.

According to the teachings of the present invention, at least one of the tags units 1 is in communication with random access memory 20. Each tags unit is typically as large as the number of words in the associative memory array. This is several thousands of words. According to a preferred embodiment of the invention, the entire contents of tags unit 1 is written to random access memory 20 in a single machine cycle.

Significantly, by comparing a single bit slice in all associative memory words to a value of '1' and storing the results in tags unit 1, the contents of that bit slice are copied to tags unit 1. This takes a single machine cycle regardless of the number of memory words in associative memory array 15. Writing this content to random access memory 20 in a single machine cycle provides parallel communication between all words in associative memory array 15 and random access memory 20.

Similarly, by reading thousands of bits of data from random access memory 20 to tags unit 1 in a single machine cycle and writing '1' to a bit slice in associative memory array 15 in all words indicated by tags unit 1 accomplishes a parallel communication between random access memory 20 and associative memory array 15. Associative memory array 15 of the present invention is enabled to perform a parallel write operation on a plurality of associative memory words.

While the invention has been described with respect to a limited number of embodiments, it will be appreciated that many variations, modifications and other applications of the invention may be made.

What is claimed is:

1. A signal processing apparatus comprising:
   I. an associative memory array featuring a plurality of associative memory words operative to perform parallel associative compare and parallel associative write operations;
   II. a random access memory for storing data generated in said associative memory array; and
   III. a plurality of tags units in communication with a plurality of said associative memory words and in communication with said random access memory, said tags units being operative as source for said parallel write operations and as destination for said parallel compare operations and operative to read and write said data in parallel to and from said random access memory, the apparatus being operative such that at least one of said plurality of tags units is in communication with said associative memory array and at least another of said plurality of tags units is in communication with said random access memory during a single machine cycle.

2. The signal processing apparatus of claim 1, wherein the random access memory is embedded DRAM.

3. The signal processing apparatus of claim 1, wherein said tags units are also operative to perform parallel communication between non-adjacent associative memory words in a single machine cycle.

4. The signal processing apparatus of claim 3, wherein said non-adjacent associative memory words are processing non-adjacent samples in an image.

5. The signal processing apparatus of claim 4 contained on a single silicon die.

* * * * *